United States Patent [19]

Clayton et al.

[11] Patent Number: 4,702,379
[45] Date of Patent: Oct. 27, 1987

[54] ORE SORTING APPARATUS

[75] Inventors: Colin G. Clayton, Abingdon; Ramon Spackman, Didcot, both of England

[73] Assignee: United Kingdom Atomic Energy Authority, London, England

[21] Appl. No.: 690,656

[22] PCT Filed: May 15, 1984

[86] PCT No.: PCT/GB84/00164
§ 371 Date: Dec. 27, 1984
§ 102(e) Date: Dec. 27, 1984

[87] PCT Pub. No.: WO84/04707
PCT Pub. Date: Dec. 6, 1984

[30] Foreign Application Priority Data

May 20, 1983 [GB] United Kingdom ............... 8314029

[51] Int. Cl.⁴ .................. B07C 5/02; B07C 5/346; G21G 1/06
[52] U.S. Cl. .................. 209/539; 198/539; 209/589; 376/159; 376/162
[58] Field of Search ............ 209/539, 576, 589, 922, 209/923; 376/159, 162; 198/380, 438, 539; 250/359.1, 360.1, 432 R, 433, 434; 193/31 R

[56] References Cited

U.S. PATENT DOCUMENTS

| | | | |
|---|---|---|---|
| 1,959,238 | 5/1934 | Horsfield | 209/580 |
| 2,835,373 | 5/1958 | Bickley | 209/539 X |
| 3,435,950 | 4/1969 | Suverkrup | 209/589 X |
| 3,872,306 | 3/1975 | Palmer | 209/589 X |
| 4,203,510 | 5/1980 | Reed | 198/438 X |
| 4,365,717 | 12/1982 | Stone | 209/539 |
| 4,365,719 | 12/1982 | Kelly | 209/586 X |

FOREIGN PATENT DOCUMENTS

| | | | |
|---|---|---|---|
| 0059033 | 9/1982 | European Pat. Off. | |
| 2101304 | 1/1983 | European Pat. Off. | 209/589 |
| 0151990 | 3/1921 | United Kingdom . | |
| 0435263 | 9/1935 | United Kingdom . | |
| 0765013 | 1/1957 | United Kingdom . | |
| 2019338 | 10/1979 | United Kingdom . | |

Primary Examiner—Randolph A. Reese
Assistant Examiner—Edward M. Wacyra
Attorney, Agent, or Firm—William R. Hinds

[57] ABSTRACT

An apparatus for ore sorting includes a neutron irradiator (12), and a detector assembly (14) for detecting gamma radiation emitted by irradiated lumps (21) of the ore. The irradiated lumps (21) after discharge from the irradiator (12), are divided into two channels (30) by at least one bifurcating device (28) held above a relatively high speed conveyor (26) transporting the lumps (21). Each channel (30) is subsequently divided into three streams (37, 38, 39) by diverting selected lumps (21) from the channel (30) as the lumps (21) are projected from the end of the high speed conveyor (26). The diverted lumps (21) in each stream (37, 38, 39) are allowed to fall on to a relatively low speed conveyor (50) which then presents the lumps (21) to the detector assembly (14).

8 Claims, 6 Drawing Figures

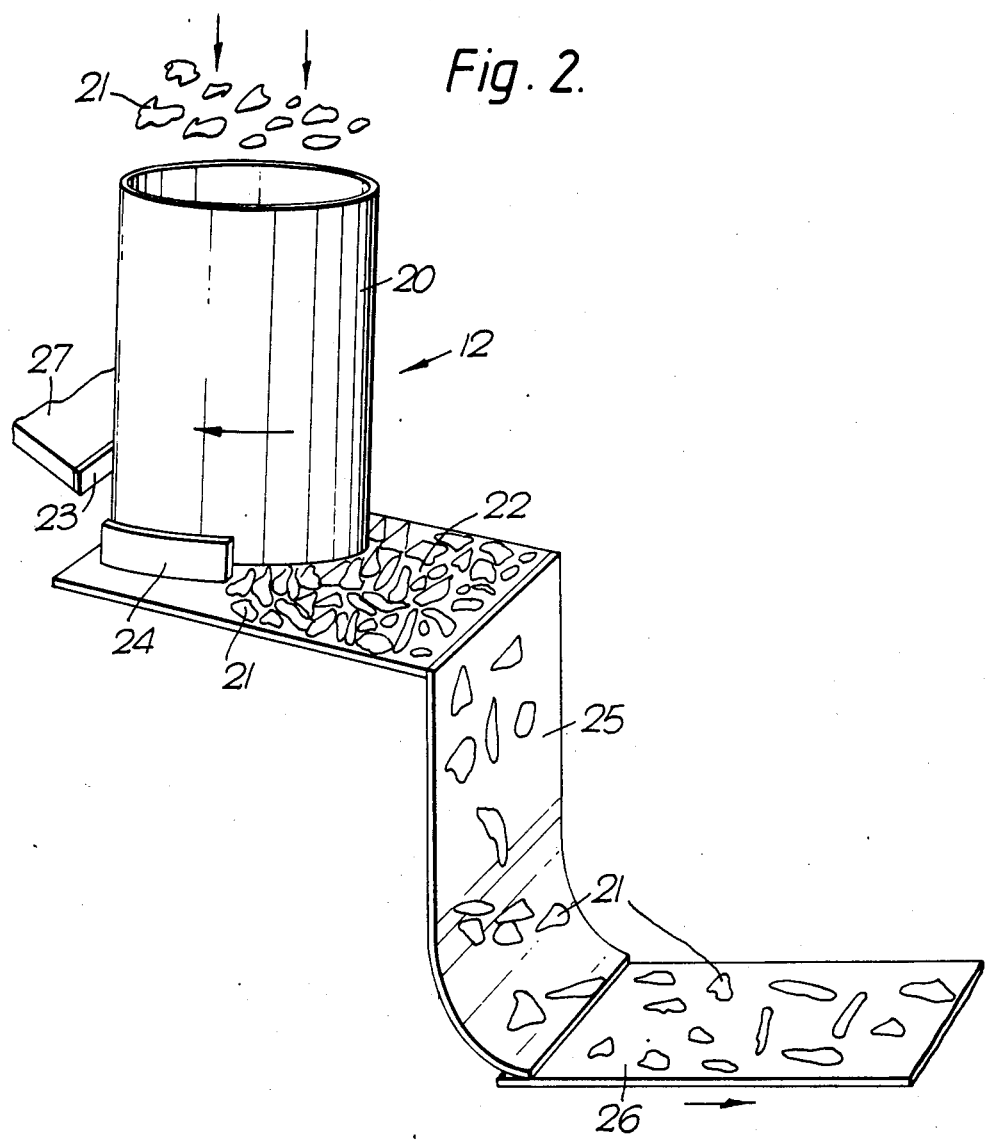

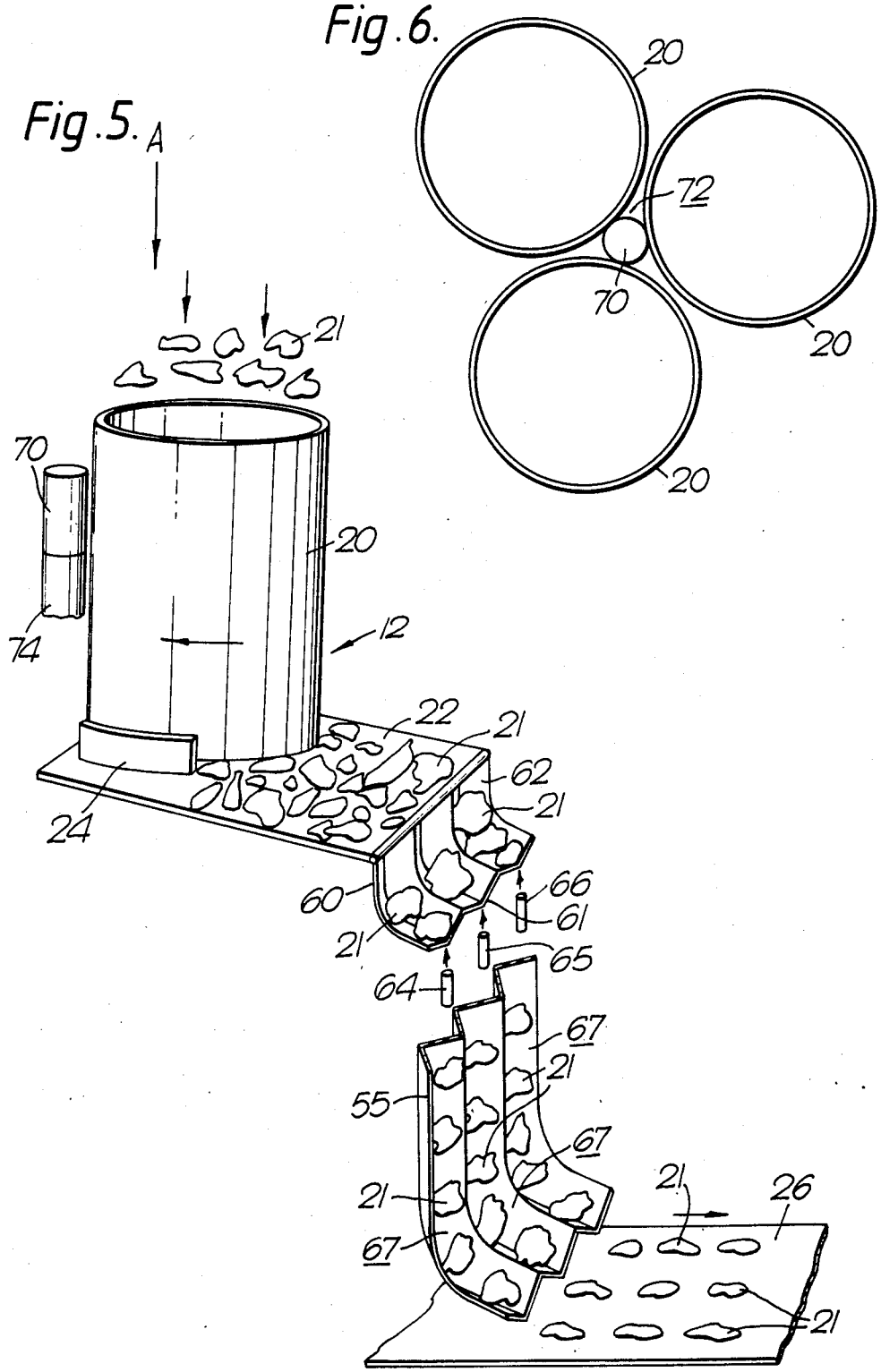

ORE SORTING APPARATUS

This invention relates to apparatus for detecting the presence of a selected substance in ores by neutron activation analysis, for example the gold content of gold-bearing ores.

A practical gold ore sorting plant needs to be able to process considerable quantities of material an hour, and hence must use a rapid analytical technique. A suitable technique is neutron activation analysis using the reaction $^{197}Au(n,n'\gamma)^{197m}Au$ to activate gold present in a lump of ore, the $^{197m}Au$ nuclides so produced decaying with a half-life of about 7.8 seconds and with the emission of $\alpha$-rays of energy 297 keV. British Patent Specifications Nos. 2055465A and 2101304A (U.S. Pat. No. 4,340,443 and application Ser. No. 383,686 filed 27 May 1982, respectively) which are incorporated by reference herein, describe apparatus for sorting gold bearing ores in which lumps of ore are activated by the above reaction, the $\alpha$-rays emitted subsequently being detected and analysed to assess the gold content of the ores.

According to the present invention, in an apparatus for sorting lumps of ore to detect the presence of a selected substance in the lumps, the apparatus comprising, an irradiator for irradiating the lumps of ore, detector means for detecting $\gamma$-rays emitted by the irradiated selected substance in the irradiated lumps, and means for transporting the lumps from the irradiator to the detector, the transporting means includes at least one dividing means for separating the lumps into a plurality of streams on a non-ramdom predetermined basis.

Desirably the transporting means includes a first dividing means for separating the lumps into a plurality of channels, and a plurality of second dividing means, one for each channel, for separating the lumps in said channel into a plurality of streams. One dividing means separates the lumps on a random basis, while the other dividing means separates the lumps on a predetermined basis. Preferably the transporting means includes a carrier means for imparting translational movement of the lumps, the first dividing means comprises an acute angled bifurcating device disposed above the carrier means in the path of the lumps and directed so as to separate the lumps on the carrier means into two spaced apart channels of lumps, each second dividing means comprises a divider chamber into which the carrier means is arranged to project the lumps from the respective channel, the divider chamber including means for diverting selected lumps from the path of the channel into at least two predetermined streams, and the transporting means also includes means for conveying the diverted lumps in the streams from the divider chamber to the detector means.

Preferably, the carrier means comprises a relatively high speed conveyor, and the conveying means comprises a plurality of relatively low speed conveyors in parallel relationship.

Desirably, the diverted lumps are arranged to collide with at least one limp, flexible member in the divider chamber to attenuate the velocity of the diverted lumps.

Advantageously, the transporting means includes a conveyor tray onto which the lumps are arranged to be discharged from the irradiator, and at least two arresting means in parallel for arresting the motion of the lumps from the tray and subsequently discharging the arrested lumps at regular intervals on to a respective groove in a grooved chute device for discharging the lumps in each groove onto a respective carrier means.

Conveniently, the arresting means comprises a permeable receptacle for receiving the lumps, and air jet means underneath the receptacle for ejecting the lumps from the receptacle on to the carrier means.

In the preferred application of the invention, the apparatus comprises apparatus for detecting the presence of gold in gold bearing ore.

The invention will now be further described by way of example only with reference to the accompanying drawings, in which:

FIGS. 2, 3 and 4, show perspective representations of portions of the apparatus of FIG. 1;

FIG. 5 shows a modification of FIG. 2, and

FIG. 6 shows a view in the direction of arrow A of FIG. 5.

Figure 1:
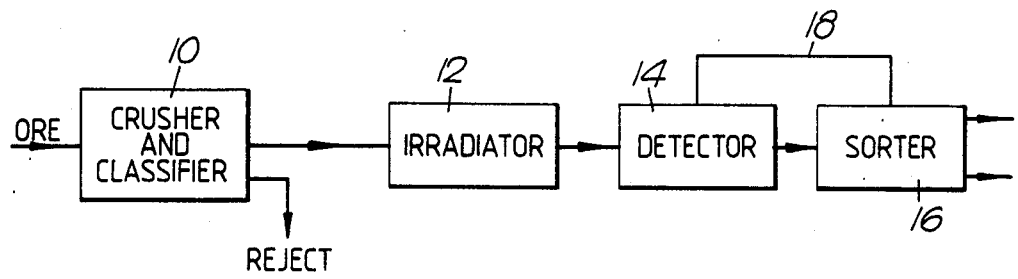
FIG. 1 shows a schematic arrangement of a gold ore sorting apparatus.

Referring to FIG. 1, a gold ore sorting apparatus comprises a rock crusher 10 to which mined ore is supplied. In the crusher 10, the ore is crushed into lumps and classified into a stream of lumps corresponding to a range between square mesh sizes of 62.5 mm and 37.5 mm. The stream is passed through a neutron irradiator 12 to activate any gold in the lumps from the reaction $^{197}Au(n,n'\gamma)^{197m}Au$, and then the activated lumps are passed to a $\gamma$-ray detector assembly 14 comprising scintillation counters arranged to detect $\gamma$-rays having an energy of 279 keV arising from the decay of $^{197m}Au$ nuclides and thus signifying the presence of gold in the lumps of ore. Once the lumps have been activated, it is essential to pass them to the detector assembly 14 as quickly as possible because of the relatively short half-life ($\sim$7.8 secs) of the $^{197m}Au$ state. Each lump is desirably interrogated individually by the detector assembly 14, to establish whether the gold content of the lump lies above or below some predetermined concentration. The critical concentration is typically in the range of a few parts per million (ppm), and might for example be set at 1 ppm. Each lump of ore is then passed into a sorter 16 arranged by means of a cable 18 to respond to signals from the detector assembly 14, and to sort each lump of ore into one of two outlet streams depending on whether the gold concentration in the lump lies above or below the predetermined concentration.

Rock crushers 10 and sorters 16 are known in the art, and the irradiators 12 and detector assemblies 14 have been described in the afore-mentioned specifications to which reference should be made for further details. However, it is important that any interaction between adjacent lumps of ore being interrogated in the detector assembly 14 is minimised, and this can be affected by variations in shape and size of the lumps and the manner in which the lumps are transported from the irradiator 12 to the detector assembly 14. Irregularities in the rate of discharge of the lumps from the irradiator 12 and the transport of the lumps to the detector assembly 14, can result in variations in the time interval between adjacent lumps at the detector assembly 14 approaching a factor ten. Hence the problem of ensuring discrete interrogation of the lumps in the detector assembly 14 can become acute.

Figure 3:
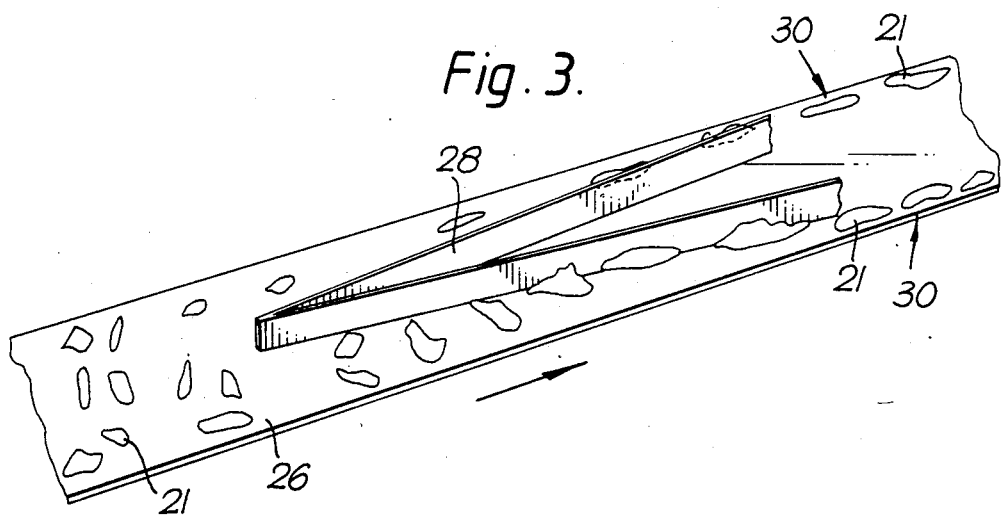

Referring now to FIG. 2, part of the irradiator 12 is shown and c omprises a vertically disposed, rotatable steel hollow cylinder 20, lumps 21 of ore being fed into the top of the cylinder 20 and irradiated lumps 21 emerging from the bottom of the cylinder 20 onto a vibrator tray 22. The cylinder 20 with other cylinders 20 (not shown) in the irradiator 12 is irradiated by a neutron source conveniently provided by a titanium deuteride target 23 on which a beam of deuterons at about 1.5 MeV in a drift tube 27 from a high voltage accelerator (not shown) impinges. The irradiated lumps 21 are constrained by a guide 24 extending partly around the bottom of the cylinder 20 to move towards a chute 25 at the end of the vibrator tray 22 and fall on to a relatively high speed (e.g. 10–20 ft/sec) (3–6 m/sec) conveyor belt 26. As shown in FIG. 3, an angular bifurcation member 28 disposed just above the conveyor belt 26, is directed towards the incoming lumps 21 and has an acute included angle (e.g. an angle of about 20°). The bifurcation member 28 separates the lumps into two discrete channels 30 at the edges of the conveyor belt 26, and at the same time to a substantial extent aligns the major axes of the lumps 21 generally longitudinally of the conveyor belt 26, guides (not shown) at the edges of the conveyor belt 26 retaining the lumps 21 on the conveyor belt 26. Since the lumps 21 are initially distributed substantially at random over the surface of the conveyor belt 26, this separation takes place on a random basis.

Figure 4:
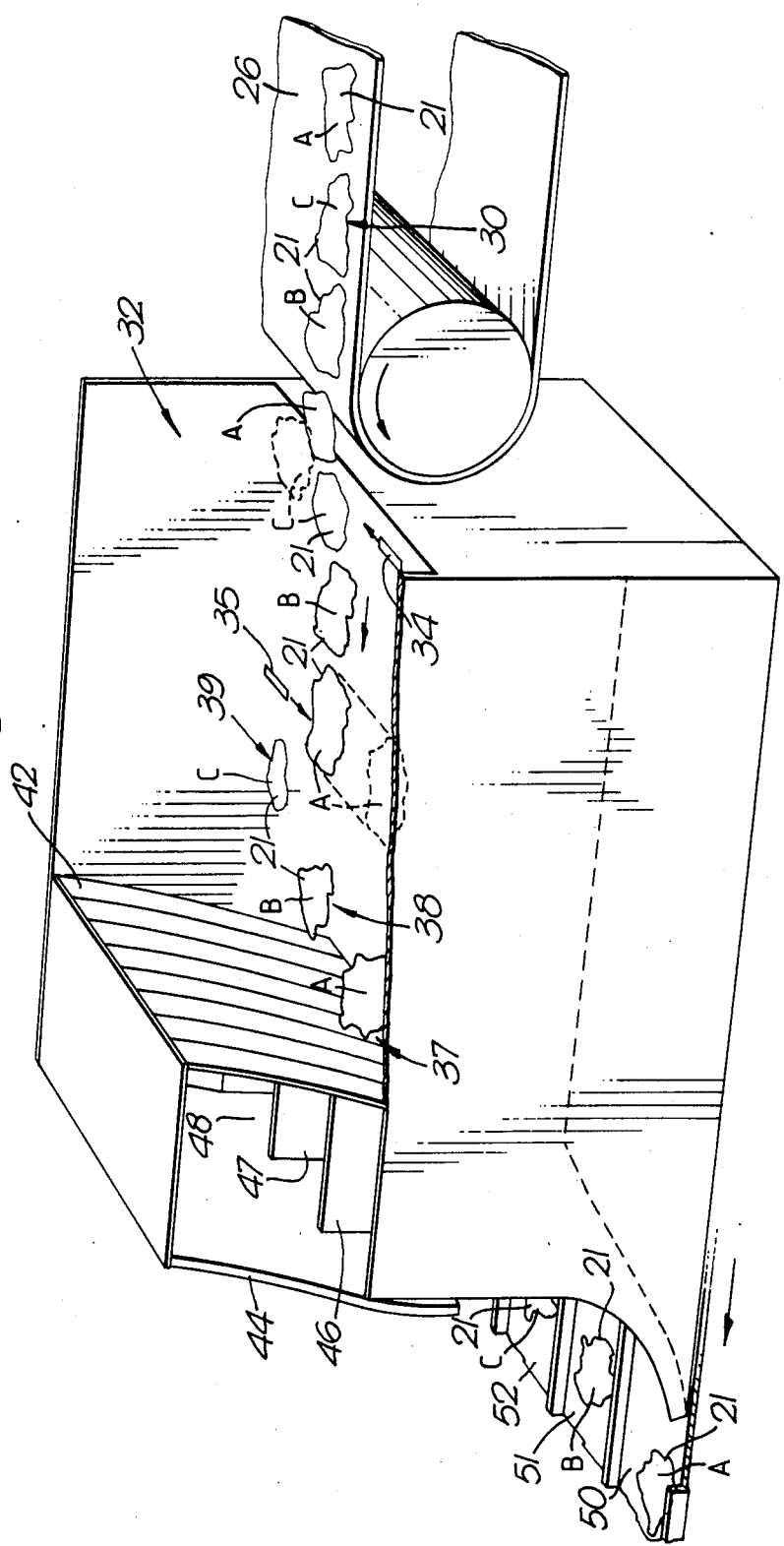

Referring now to FIG. 4, the conveyor belt 26 terminates at two divider chambers 32 (only one is shown), one aligned with each of the channels 30, and into which the lumps 21 are projected by the relatively high speed motion of the conveyor belt 26. In each divider chamber 32 two air jet devices 34, 35 are disposed in opposite but longitudinally displaced relationship about the channel 30, and in order to detect the presence of the lumps 21, infra-red sources (not shown) and detectors (not shown) are provided and are linked to the air jet devices 34, 35 for controlling operation of the air jet devices 34, 35. The air jet devices 34, 35 operate by diverting from the channel 30 two out of every three lumps 21 of ore to one side or other of the divider chamber 32 so that three streams 37, 38, 39 respectively of lumps 21 are formed from each channel 30. For clarity, consecutive lumps 21 in the channel 30 have been designated A, B, C. Thus stream 37 contains the lumps 21 marked A, stream 38 contains the lumps 21 marked B, and stream 39 contains the lumps 21 marked C, the paths through which the A and C lumps 21 are diverted being shown in broken line. The relatively high speed of the lumps 21 in each stream 37, 38, 39 is attenuated by the lumps 21 passing a split curtain 42 and impacting on to a heavy rear curtain 44, the lumps 21 then falling down a respective chute 46, 47, 48, which positions the lumps 21 accurately on to a corresponding relatively slow speed (3–7 ft/sec) (1–2 m/sec) conveyor belt 50, 51 or 52, to transport the lumps 21 to the detector assembly 14.

At the detector 14, the scintillation counters (not shown) are in close contact to ensure that continuous counting is carried out. It will be appreciated that the separation and spacing of the lumps 21 achieved after discharge from the irradiator 12, should minimise if not eliminate the need for deconvoluting signals from scintillation counters which interrogate more than one lump 21 simultaneously. Since the number of counts recorded from a lump 21 (signal plus noise) might not exceed ten, deconvolution is to be avoided as far as possible in order to minimise random uncertainty in the detector assembly 14.

In order to improve still further the separation of the lumps 21 from the irradiator 12, some sub division of the lumps 21 may take place before the lumps 21 are dropped on to the conveyor 26, for example as shown in FIG. 5 to which reference is made. In FIG. 5 which in many respects is identical to FIG. 2 in having a cylinder 20 and a vibrator tray 22, three wire frameworks providing receptacles 60, 61, 62 are positioned in parallel between a grooved chute 55 and the vibrator tray 22, and respective air jet devices 64, 65, 66 are positioned underneath the receptacles 60, 61, 62. The receptacles 60, 61, 62 collect lumps 21 of ore from the vibrator tray 22, the lumps 21 subsequently being ejected regularly from the receptacles 60, 61, 62 by the air jet devices 64, 65, 66 to fall into a respective groove 67 of the chute 55 which at its lower end discharges the lumps 21 in each groove 67 on to the conveyor 26 of FIG. 2 where further sub division of the lumps 21 occurs.

Referring now to FIG. 6, the cylinder 20 of FIG. 5 is shown adjacent to two rotatable cylinders 20 of adjacent irradiators (only the cylinders 20 are shown). A neutron source in the form of a lithium target 70 is located in a space 72 between the cylinders 20 so as to irradiate lumps 21 of ore in each cylinder 20 from a single neutron source. Referring again to FIG. 5, the lithium target 70 is positioned at the end of a flight tube 74 from a proton accelerator (not shown) and which extends parallel to the longitudinal axes of the cylinders 20.

In operation, the accelerator is energised to cause a beam of protons of energy about 4.5 MeV to bombard the lithium target 70, the proton beam being moved around the surface of the lithium target 70 to avoid localized overheating. Fast neutrons of energy between about 0.5 MeV and 2.8 MeV are produced by the reaction $^{7}_{3}Li(p,n)^{7}_{4}Be$, and irradiate the lumps 21 of ore in the adjacent cylinders 20 in a similar manner to that described in relation to the irradiator of FIG. 2.

If desired, the neutron source of FIG. 5 may be used in the irradiator of FIG. 2 and vice versa, or other neutron sources may be used. Furthermore, the cylinder 20 of FIG. 2 may be adjacent to other cylinders (not shown) of other irradiators (not shown), for example two other cylinders, and the cylinder facing the target 23 may be of larger diameter than the cylinders at the sides of the target 23 and might be fed with larger lumps 21 of ore.

It will be understood that if desired a plurality of bifurcation members 28 may be used so as to divide the lumps 21 on the conveyor belt 26 into more than two channels 30, or may be used elsewhere in the apparatus. Although each divider chamber 32 has been described in relation to dividing each channel 30 into three streams 37, 38, 39, an alternative divider chamber may be used to divide each channel 30 into an alternative number of streams.

What is claimed is:

1. An apparatus for sorting lumps of ore to detect the presence of a selected substance in the lumps, the apparatus comprising, an irradiator for irradiating the lumps of ore, detector means for detecting γ-rays emitted by the irradiated selected substance in the irradiated lumps, and means for transporting the lumps from the irradiator to the detector, wherein the transporting means includes at least one dividing means for separating the lumps into a plurality of streams on a non-random predetermined basis.

2. An apparatus as claimed in claim 1 wherein the transporting means also includes a conveyor tray onto which the lumps are arranged to be discharged from the irradiator, and at least two arresting means in parallel for arresting the motion of the lumps from the tray and subsequently discharging the arrested lumps at regular intervals.

3. An apparatus as claimed in claim 2 wherein the arresting means comprises a permeable receptacle for receiving the lumps, and air jet means underneath the receptacle for ejecting the lumps from the receptacle.

4. An apparatus for sorting lumps of ore to detect the presence of a selected substance in the lumps, the apparatus comprising, an irradiator for irradiating the lumps of ore, detector means for detecting γ-rays emitted by the irradiated selected substance in the irradiated lumps, and means for transporting the lumps from the irradiator to the detector, wherein the transporting means includes a first dividing means for separating the lumps into a plurality of channels, and a plurality of second dividing means, one for each channel, for separating the lumps in said channel into a plurality of streams, wherein one dividing means separates the lumps on a random basis, while the other dividing means separates the lumps on a predetermined basis.

5. An apparatus as claimed in claim 4 wherein the transporting means includes a carrier means for imparting translational movement of the lumps, the first dividing means comprises an acute angled bifurcating device disposed above the carrier means in the path of the lumps and directed so as to separate the lumps on the carrier means into two spaced apart channels of lumps, each second dividing means comprises a divider chamber into which the carrier means is arranged to project the lumps from the respective channel, the divider chamber including means for diverting selected lumps from the path of the channel into at least two predetermined streams and the transporting means also includes means for conveying the diverted lumps in the streams from the divider chamber to the detector means.

6. An apparatus as claimed in claim 5 wherein the carrier means comprises a relatively high speed conveyor, and the conveying means comprises a plurality of relatively low speed conveyors in parallel relationship.

7. An apparatus as claimed in claim 6 wherein the diverted lumps are arranged to collide with at least one limp, flexible member in the divider chamber to attenuate the velocity of the diverted lumps.

8. An apparatus as claimed in claim 5 wherein the diverted lumps are arranged to collide with at least one limp, flexible member in the divider chamber to attenuate the velocity of the diverted lumps.

* * * * *